(12) United States Patent
Zhao

(10) Patent No.: US 10,331,725 B2
(45) Date of Patent: *Jun. 25, 2019

(54) CONTENT RECOMMENDATION SYSTEM

(71) Applicant: Comcast Cable Communications, LLC, Philadelphia, PA (US)

(72) Inventor: Zhen Zhao, Berwy, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/677,889

(22) Filed: Aug. 15, 2017

(65) Prior Publication Data

US 2018/0189293 A1 Jul. 5, 2018

Related U.S. Application Data

(63) Continuation of application No. 14/556,790, filed on Dec. 1, 2014, now Pat. No. 9,767,102.

(51) Int. Cl.
*G06F 16/435* (2019.01)
*G06F 16/438* (2019.01)

(52) U.S. Cl.
CPC ........ *G06F 16/4387* (2019.01); *G06F 16/435* (2019.01)

(58) Field of Classification Search
CPC .................. G06F 17/30867; G06Q 30/0631
USPC .................. 715/763–765, 740, 851, 853
See application file for complete search history.

(56) References Cited

U.S. PATENT DOCUMENTS 9,183,258 B1* 11/2015 Taylor ............... G06F 17/30867
2015/0052121 A1* 2/2015 Sharifi ............... G06Q 30/0631
707/723

* cited by examiner

*Primary Examiner* — Cao H Nguyen
(74) *Attorney, Agent, or Firm* — Banner & Witcoff, Ltd.

(57) ABSTRACT

Disclosed are systems and methods for determining similarities in content preferences among a plurality of users and generating content recommendations based on a requesting user's content consumption history. A requesting user may access the recommendation system to request content items for consumption. The recommendation system may be configured to identify users having consumed the same or similar content items as the requesting user, and to determine a ratio of content items consumed by the requesting user and an identified user to the total number of content items previously consumed by the requesting user. In one embodiment, the system may determine a degree of similarity in content preferences between the two users based on an inverse proportion of a level of popularity associated with the content items consumed by the requesting user and the identified user (e.g., sampled user).

21 Claims, 9 Drawing Sheets

User Similarity Score Rankings:

| Ranking | User | Similarity Coefficient ($US_{1,x}$) |
|---|---|---|
| 1 | User 2 | 0.01389 |
| 2 | User 3 | 0.00471 |
| 3 | User 4 | 0.00264 |

Content Recommendations:

Top Recommending Users

| Rank: | Username: | Match(%) | | Rank: | Username: | Match(%) |
|---|---|---|---|---|---|---|
| 1. | Ramses I | 57% | | 5. | Chronus713 | 25% |
| 2. | DaTruth508 | 48% | | 6. | K-LoveFan | 24% |
| 3. | GoldGlove314 | 29% | | 7. | MrNBA504 | 21% |
| 4. | TheRock004 | 27% | | 8. | AH2004 | 19% |

Click to see more User Rankings     Adjust User Rankings

FIG. 4D

Content Recommendations:

Your top Recommender, *Ramses I*, recommends the movie: PEOPLE LIKE US.

Your second top Recommender, *DaTruth508*, recommends the movie: RAID.

Click for More Recommendations

FIG. 4E

CONTENT RECOMMENDATION SYSTEM

CROSS-REFERENCE TO RELATED APPLICATIONS

This application is a continuation of U.S. application Ser. No. 14/556,790, entitled "Content Recommendation System" and filed on Dec. 1, 2014, which is entirely incorporated herein by reference.

BACKGROUND

Content users have a large variety of content options at their disposal. A user often has hundreds of channels or services available to deliver and consume content at any given moment, and many additional items of content that the user may choose to consume. Identifying new content to consume can be difficult. Accordingly, there remains an ever-present need to assist users to locate content that may be of particular interest to that user.

SUMMARY

The following summary is for illustrative purposes only, and is not intended to limit or constrain the detailed description. The following summary merely presents various described aspects in a simplified form as a prelude to the more detailed description provided below.

Features herein relate to a content recommendation system and method that may be used as a stand-alone recommendation system or comprise a portion of another recommendation system. Some embodiments may relate to a content recommendation system that lets a requesting user navigate through content items available for consumption, from their desktop, tablet, smart phone, set top box, or some other computing device, that have been recommended by the system. The content recommendation system may generate recommendations based on the consumption history of the user requesting the content recommendation (i.e., the requesting user), the consumption history of one or more other users or groups of users, and/or other user content consumption preferences.

In some embodiments, users may be considered to have similar content tastes or preferences if they have consumed one or more of the same content items, or if they have indicated that they both dislike the same content items (e.g., by providing a low review score in rating the content). The system may identify users considered to have similar content preferences as the requesting user (e.g., users that have consumed similar content as the requesting user, or registered a dislike of the same content), and may generate directional content similarity scores to indicate the relative significance of the fact that a particular content was consumed by one user and not the other. According to additional aspects of this disclosure, the directional content similarity score for a first user with respect to a second user may be determined by calculating the portion of the total number of content items consumed by the first user that have also been consumed by the second user. Accordingly, users may have a unique directional content similarity score with respect to each other user based upon similarities in consumption history.

The system may also generate user similarity scores based on the rarity of their commonly-consumed content items and/or commonly disliked content items, so if two users both viewed a rarely-watched video program, or if two users disliked the same program, that common program may have a greater impact on a similarity score between the users than, for example, if the users both happened to watch a video program that was also watched by millions of other viewers, or if they both disliked programs that were disliked by many other viewers. In some aspects of this disclosure, the level of popularity associated with a content item may be determined based on a variety of factors, such as cost, number of views, number of purchases, etc.

Distinguishing user content preferences based on the popularity of content items allows the recommendation system to detect and emphasize similarities in user content preferences for generally less popular content items. Focusing on such similarities may provide a better indication of similar user content preferences than focusing on generally more popular content items that are consumed by a larger number of users having a greater spectrum of content preferences. The system may utilize user similarity scores to sort users and/or determine user rankings based on a similarity in content preferences with the requesting user. The system may then generate content recommendations based on the consumption history of the one or more users that have been identified as having the most similar content tastes or preferences as the requesting user.

According to additional aspects of this disclosure, the recommendation system may provide the requesting user with one or more options to adjust content recommendations in accordance with user preferences. In some embodiments, the requesting user may have the option of limiting the one or more groups of users from which the recommendation system may identify users having similar content preferences as the requesting user. In another embodiment, the system may adjust initial content recommendations based on content feedback and/or content ratings provided by the requesting user and/or other users.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 4D-E illustrate exemplary user interfaces for displaying user rankings and content recommendations according to one or more illustrative aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
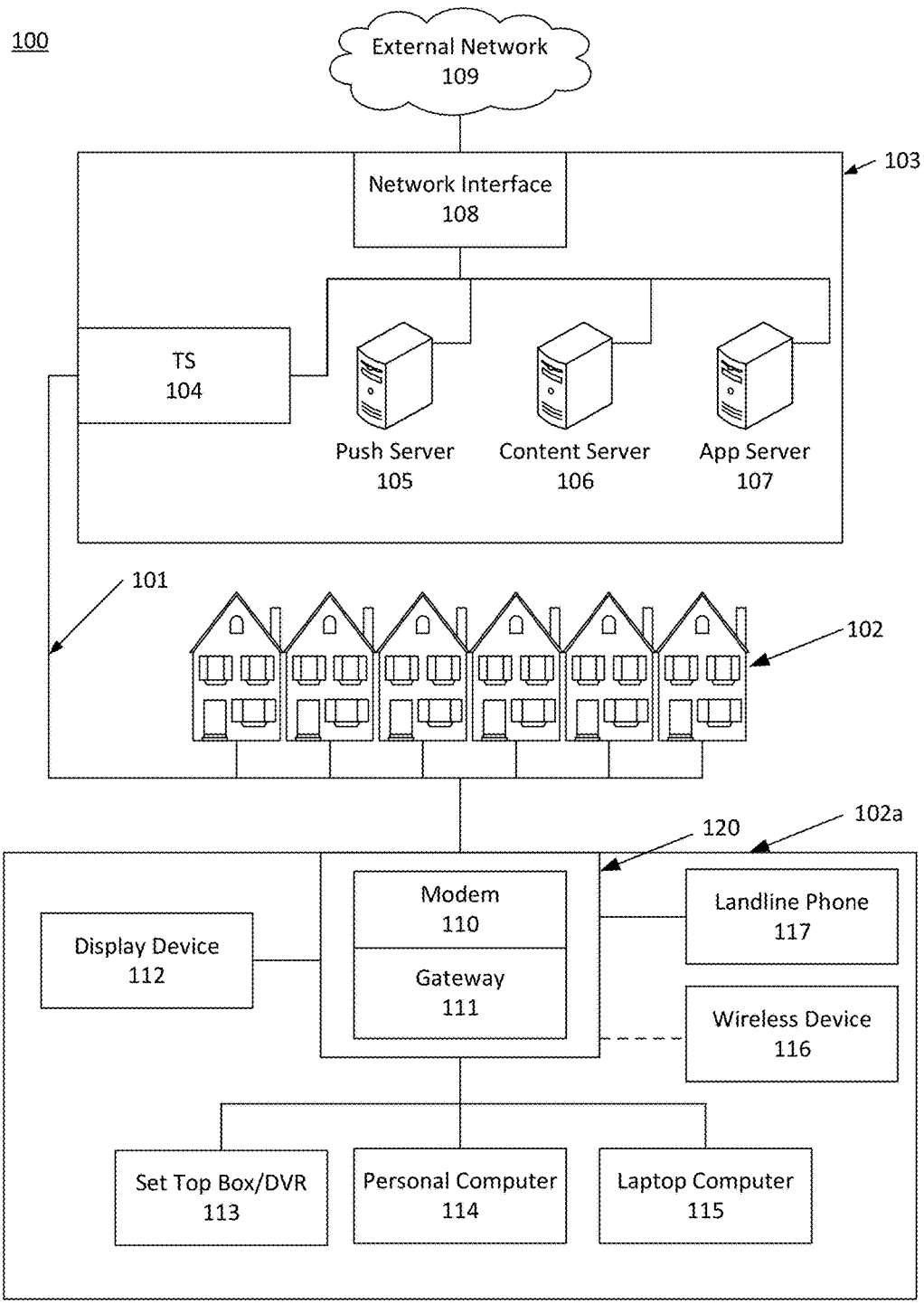
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. In a hybrid fiber-coaxial network, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand ("VOD") movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
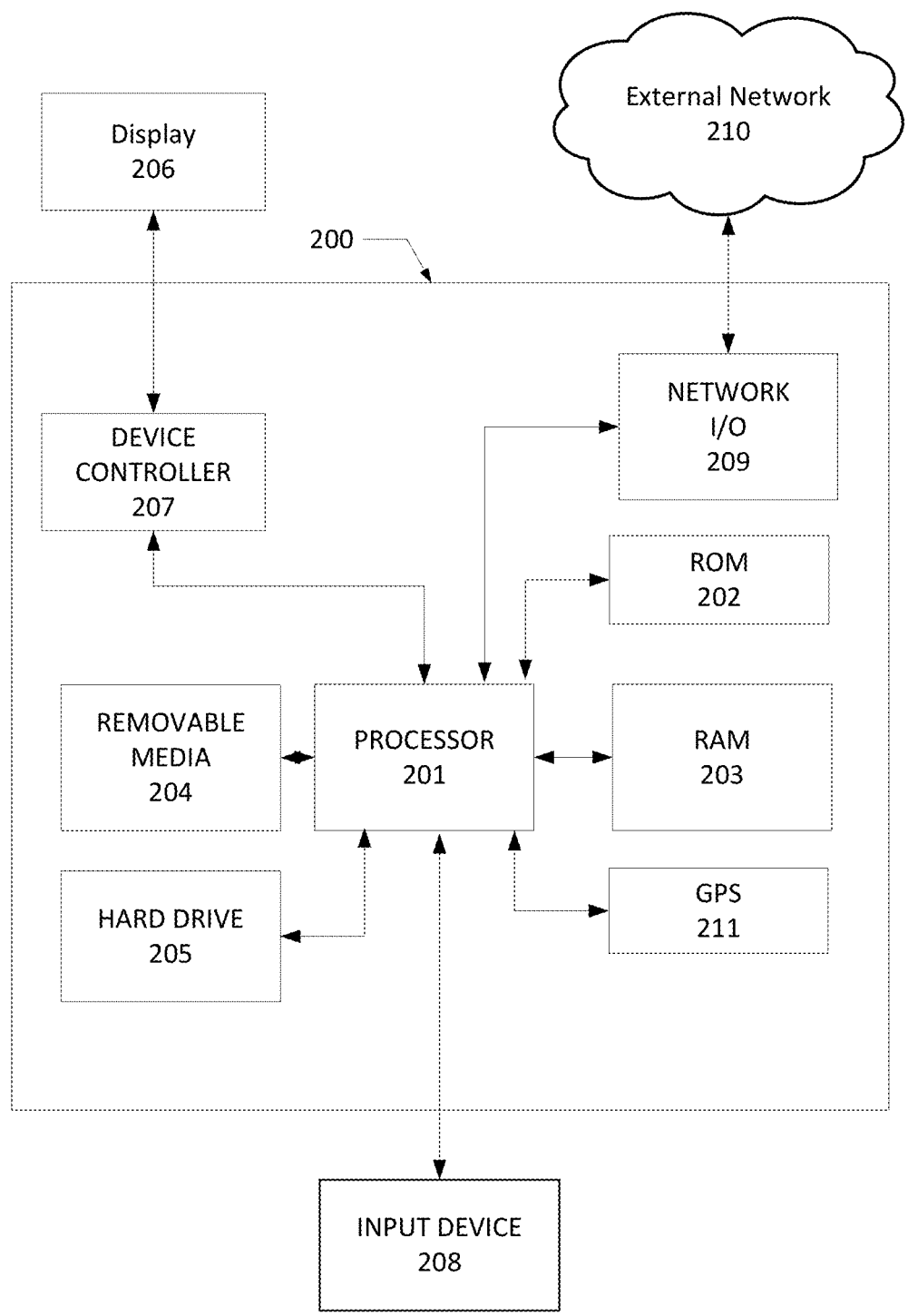
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

Figure 3A:
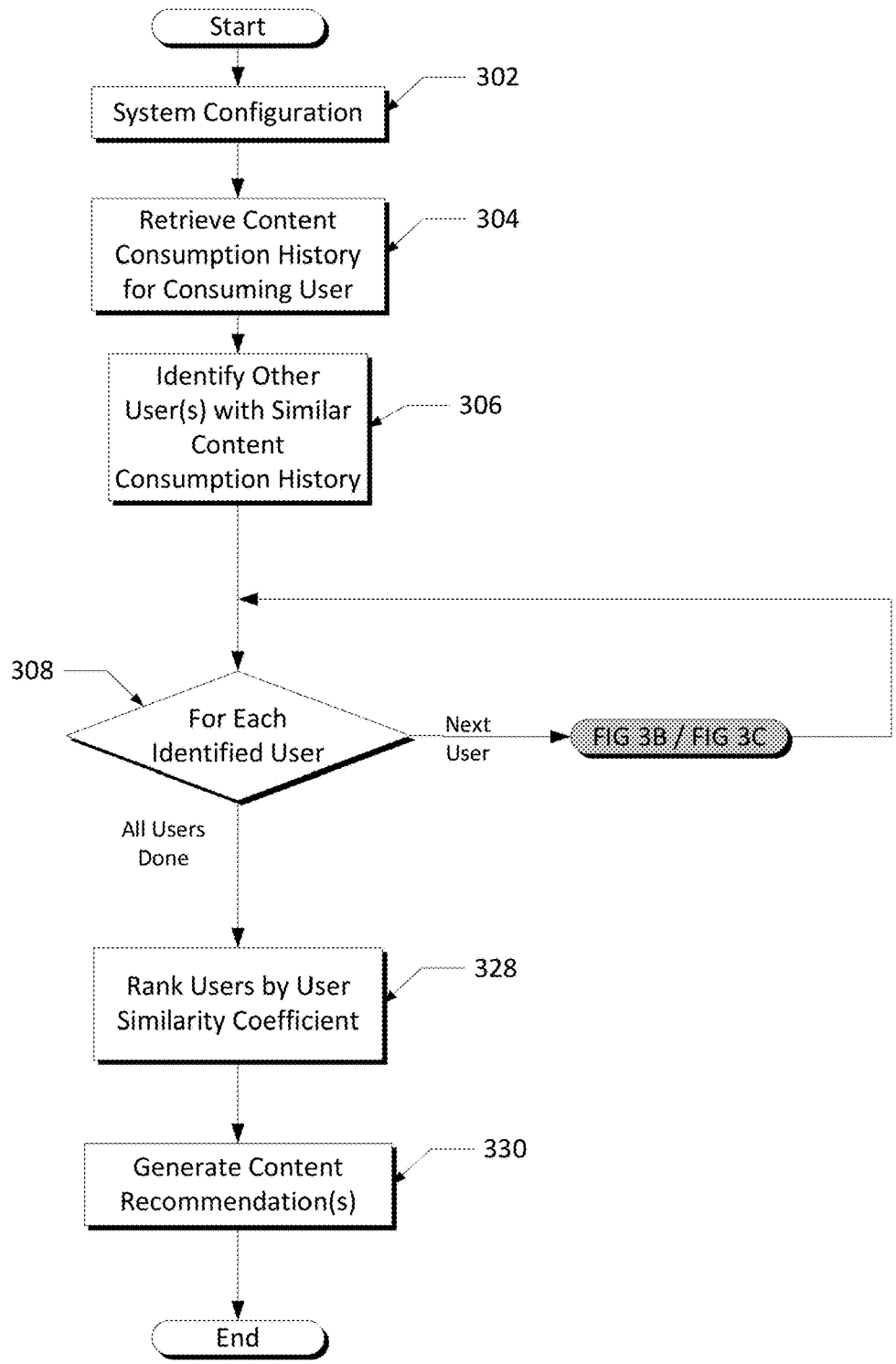
FIGS. 3A-C illustrate exemplary flowcharts of a method for generating content recommendations in accordance with one or more aspects of the disclosure.
Figure 3B:
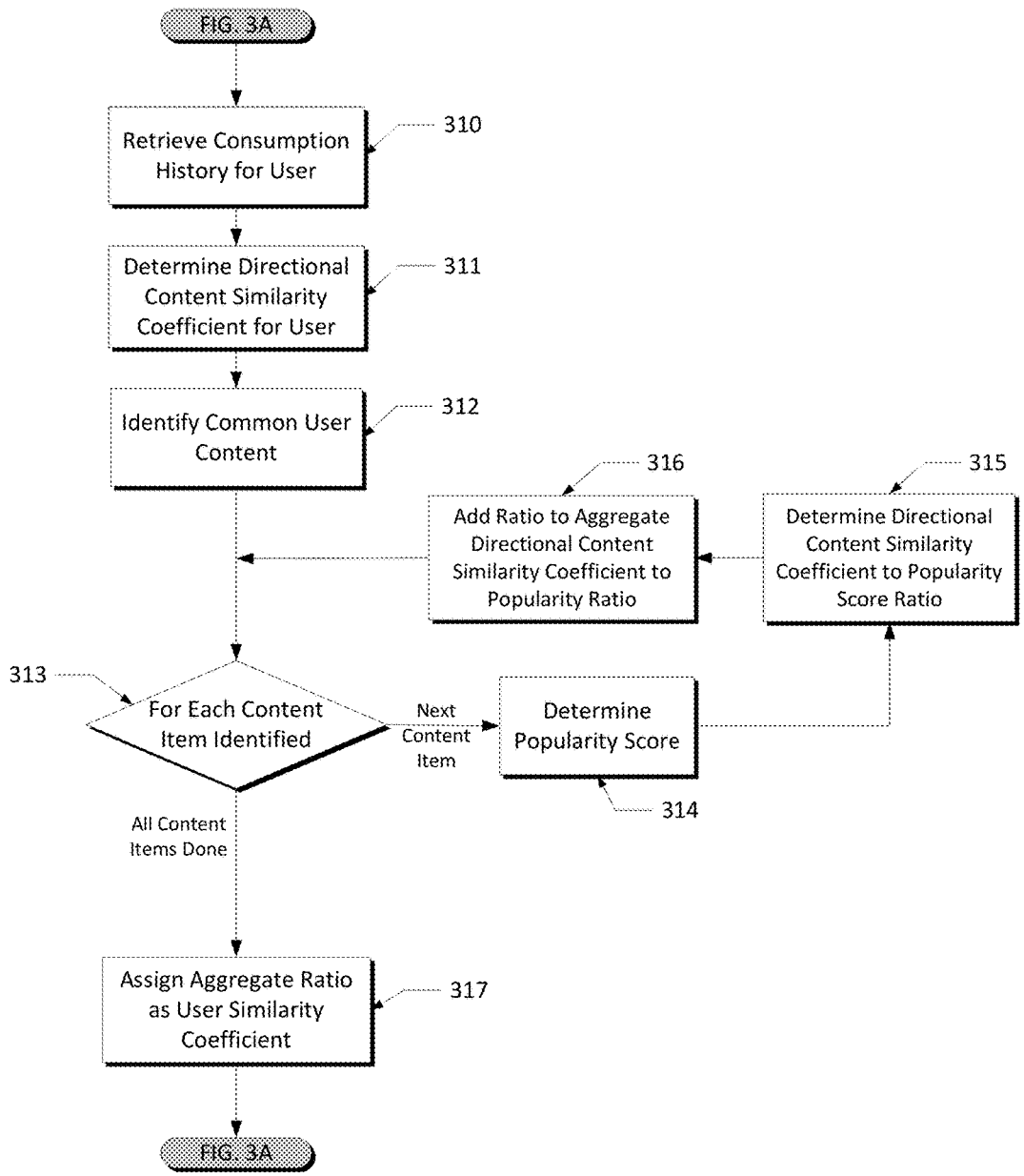
Figure 3C:
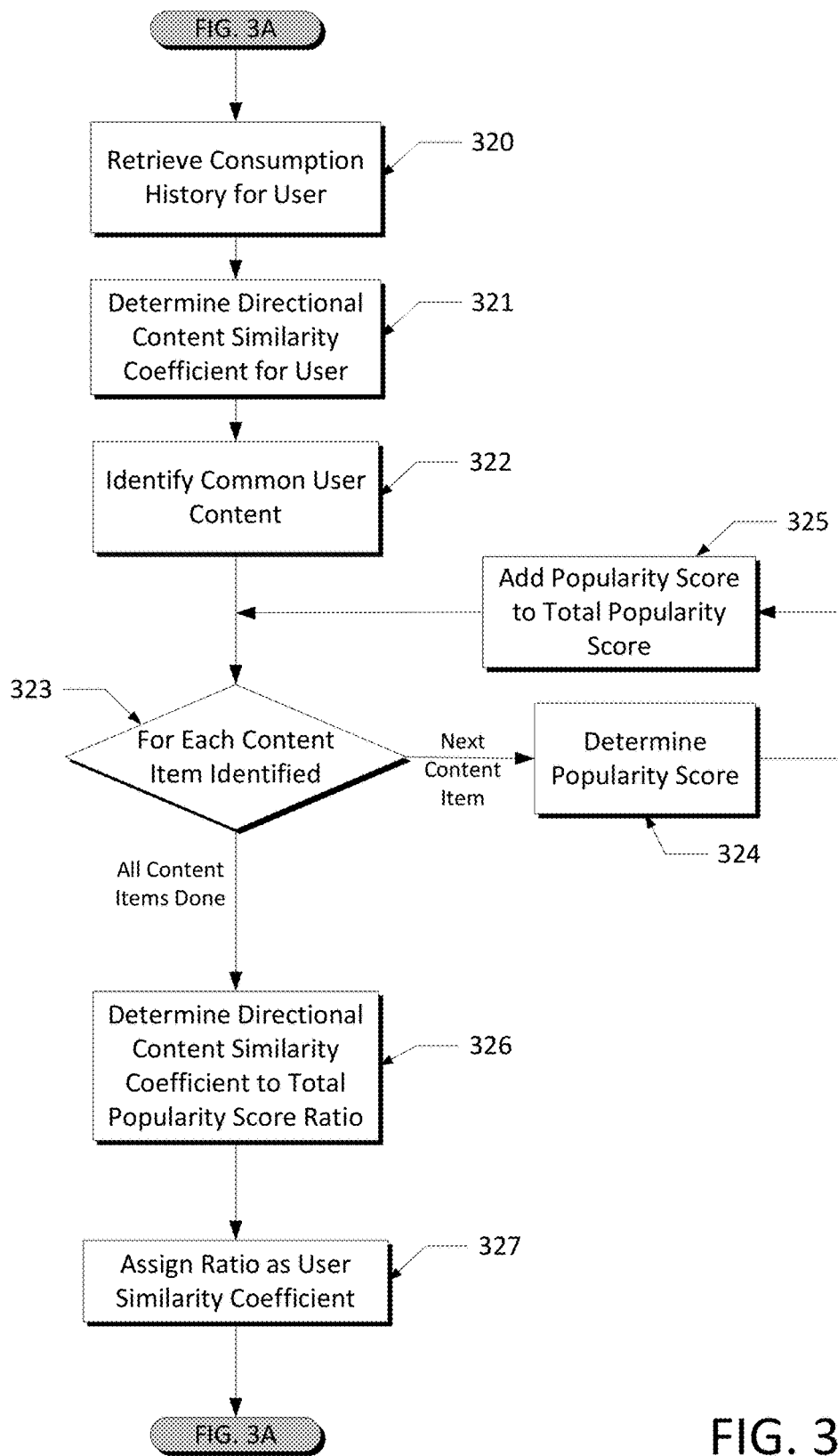

FIGS. 3A-C illustrate an example method of generating content recommendations according to one or more embodiments of the disclosure that may be performed by any desired computing device, such as computing device 200, a content server 106, an application server 107, etc. In the FIG. 3A-C examples, a user may be consuming content on any device such as a smartphone or a television (e.g., display device 112 via the gateway 111 or via a STB/DVR 113), and may receive consumption data and other information from servers 105-107, or another suitable computing device. When describing the steps of the method below, the term "system" may be used when referring to each component, either singularly or collectively, employed at each step of the method. Such usage is merely for ease in discussing the method, and should not be interpreted as limiting the exact embodiment in which the following method may be performed.

Beginning at step 302 an initial configuration of the system may be performed. This initial configuration may include a variety of actions. For example, a content recommendation application may be installed onto the requesting user's device, such as the requesting user's smartphone 116, or installed onto a suitable computing device operatively connected to a display device (e.g., display device 112). The application may provide an easy command that allows the requesting user to quickly retrieve recommendations for content items based on the consumption history of one or more other users (e.g., sampled users). The initial configuration may also include establishing the requesting user's account with a content service (e.g., creating an account, with username and password or other security, to allow the requesting user to consume content on devices such as the STB/DVR 113) which may be, for example, a service operated by the content server 106 that provides streaming video content to the requesting user's authorized devices.

On the topic of authorized devices, the initial configuration may also entail registering the STB/DVR 113, computers 114/115, wireless devices/smartphones 116, and any other device that is serviceable by the content service, with the content server 106. This device registration may include providing the content server 106 with address information for the devices (e.g., a physical address, media access control (MAC) address, etc.), information identifying the device's capabilities (e.g., types of user interaction inputs/outputs available, memory size, processor type, form factor, display size and resolution, number of speakers, etc.).

In step 304, the system may retrieve content consumption history data for the requesting user. The content service provider may track and record the consumption history and/or consumption behavior of a user over time as they utilize the content service to identify and consume content items. The system may retrieve from memory (or another computing device) information indicating the various content items that have been purchased and/or consumed by a particular user (e.g., the requesting user) over a predetermined period of time (e.g., one month, one year, etc). The user content consumption history data retrieved by the system may include information indicating a level of popularity (e.g., popularity score) for a particular content item (e.g., a content item consumed by the requesting user). The popularity score for a content item may be determined in a number of ways without departing from the scope of the present disclosure. For example, the popularity score of a content item may indicate the number of times the content item has been purchased by one or more users of the content service within a predetermined time period. As another example, the popularity score of a content item may indicate the number of times the content item has been consumed (e.g., viewed) by one or more users within a predetermined time period. Thus, higher popularity scores indicate higher levels of popularity associated with the particular content item among users of the content service. In some embodiments, the system may retrieve user content consumption history data from a user profile (or user account) associated with the requesting user.

In some embodiments, the system may determine that a user has consumed a content item if the user has consumed at least a threshold length of the playing time for the content item. For example, the system may determine that a user has consumed a content item if at least 50% of the content item has been consumed. As another example, the system may determine that a user has consumed a content item if at least 75% of the content item has been consumed. Any desirable threshold may be used by the system to determine whether a content item has been consumed without departing from the scope of the present disclosure.

Figure 4A:
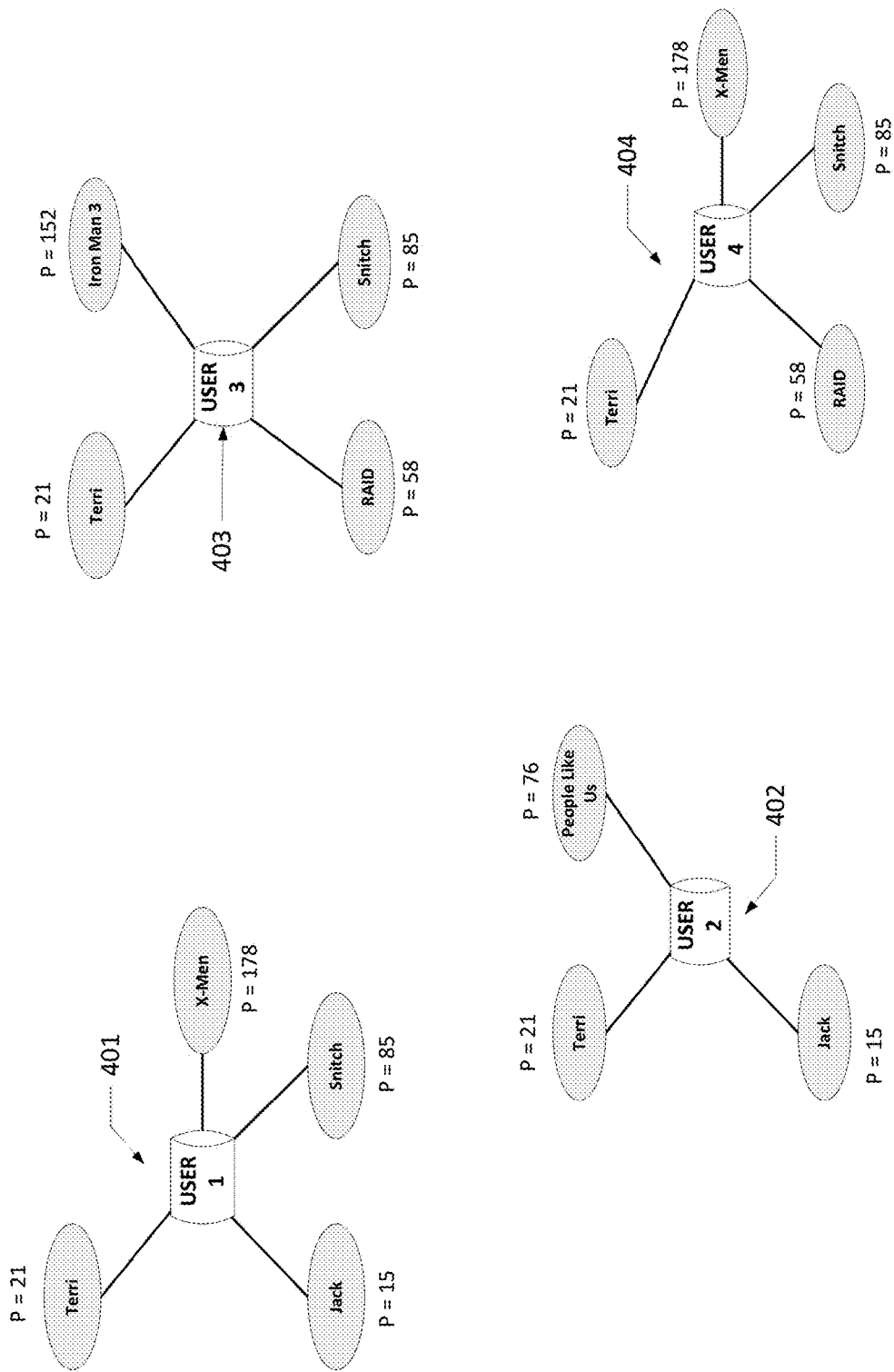
FIGS. 4A-C illustrate an exemplary diagrams and user rankings for generating content recommendations according to one or more illustrative aspects of the disclosure.

FIG. 4A illustrates example diagrams depicting consumption history information for several users of a content service (e.g., Users 1-4). In this example, the content consumption history for the requesting user (i.e., User 1) is depicted by element 401. As shown in FIG. 4A, User 1 has previously consumed four separate content items, each associated with a particular popularity score. In this example, the popularity score indicates the number of instances that a content item has been consumed within the past month. As such, the content item labeled "Terri" has a popularity score of 21, thus indicating that the content item had been consumed 21 times within the past month by one or more users of the content service. As illustrated in FIG. 4A, the content item labeled "X-Men" has a popularity score of 178; the content item labeled "Snitch" has a popularity score of 85; and the content item labeled "Jack" has a popularity score of 15. In this example, "Snitch" has the highest popularity score (or level of popularity) of the content items previously consumed by User 1, and may be considered more popular than the other content items that User 1 has consumed within the past month.

In step 306, the system may identify one or more other users with a similar content consumption history as the requesting user. In some embodiments, the system may determine whether any of the content items consumed by the requesting user has also been consumed by one or more other users of the content service. For example, the system may compare a list of content items consumed by a first user with a list of content items consumed by a second user to determine whether any content item(s) have been consumed by both users. The system may provide the requesting user with various options to limit the types and/or categories of users that are identified as having consumed similar content. For example, the system my limit which sampled users (e.g., users whose consumption history or other consumption preferences may be used by the system to determine content recommendations for the requesting user) are identified based on the geographic location of the user. In this example, the system may identify sampled users located in a particular geographic location (e.g., city, zip-code, state, etc.) that have a similar content consumption history as the requesting user. As another example, the system may identify users that have consumed a minimum number (e.g., at least two) of the content items that were previously consumed by the requesting user. As yet another example, the system may be configured to limit the pool of identifiable users based on user ratings, number of content items consumed, or any other suitable user criteria. From the above, the system may identify a group of users whose consumption histories overlap with the requesting user's consumption history in some manner. With this information, the system may then consult the consumption histories of those other users to determine what other content, consumed by another user may be of interest to the requesting user.

In the example shown in FIG. 4A, in addition to the requesting user (i.e., User 1), three other users (e.g., Users 2-4) have been identified as having previously consumed at least one content item in common with User 1. As illustrated in FIG. 4A, User 1 and User 2 have both consumed "Terri" and "Jack;" User 1 and User 3 have both consumed "Terri" and "Snitch;" and User 1 and User 4 have both consumed "X-Men," "Terri," and "Snitch." As an example, if User 1 selected an option to limit the pool of identified users those users having previously consumed at least three content items in common with User 1, the list of identified users would be narrowed to only User 4.

At step 308, the system may begin a loop that is performed for the one or more users identified during step 306 (e.g., sampled users). In some embodiments, the system may begin a loop that is performed for one, some, or all of the sampled users identified during step 306. FIG. 3B illustrates this loop in detail, and shows an example method of determining a directional content similarity score and other metrics for each corresponding user, based on the consumption histories of the corresponding user and the requesting user. Referring now to FIG. 3B, at step 310, the system may retrieve content consumption history data for the sampled user being analyzed at step 308. During step 310, the system may retrieve a listing of each of the content items previously consumed by the sampled user being analyzed during step 308 for a predetermined time period (e.g., a month). The system may also retrieve data indicating the popularity score for each content item consumed by the sampled user. In some embodiments, step 310 may be performed during step 306. As illustrated by elements 402-404 in FIG. 4A, the respective content consumption history data for Users 2-4 (e.g., sampled users) is depicted by the individual content items and associated popularity scores.

At step 311, the system may determine a directional content similarity coefficient (e.g., directional content similarity score) for the sampled user being analyzed at step 308. The directional content similarity coefficient represents a value indicating the relative significance of the fact that a particular content was consumed by one user and not the other. The directional content similarity coefficient may be based on a ratio of the number of programs in common between two users, and the total number of programs consumed by each respective user. For example, if users A and B have 10 programs in common in their consumption histories, but user A has only 11 programs total in his/her consumption history (e.g., user A has previously consumed 11 content items over a predetermined time period), while user B has 100 programs in his/her consumption history, then the commonality of content preferences is greater in one direction than another (e.g., the commonality of content preferences is greater for user A relative to user B, than it is for user B relative to user A). In other words, the content consumed by both user A and user B comprises a greater proportion of the total content consumed by user A (e.g., 10 out of 11 programs), than the proportion of the total content consumed by user B (e.g., 10 out of 100 programs). As such, the unwatched eleventh program in user A's history is more likely to be of interest to user B, and the unwatched $90^{th}$ programs in user B's history are less likely to be of interest to user A. Accordingly, and as discussed in more detail below, the system may utilize the directional content similarity coefficient to reflect this type of disparate effect of commonality among users of the content service.

In some embodiments, the system may determine a directional content similarity coefficient for the requesting user with respect to a second user (e.g., the user(s) being analyzed during step 308) by calculating the ratio of the number of content items that have been consumed by both the requesting user and the sampled user to the total number of content items that have been consumed by the requesting user. The system may store the calculated directional content similarity coefficient value in memory for subsequent retrieval. For example, referring to the example in FIG. 4A, the directional content similarity coefficient for User 1 ("U1") with respect to User 2 ("U2") may be determined by calculating the portion of the total number of content items consumed by User 1 that have also been consumed by User 2. As noted above, User 1 has previously consumed 4 content items, and User 1 and User 2 have both consumed two content items (e.g., "Terri" and "Jack"). Thus, the directional content similarity coefficient for User 1 with respect to User 2 ("$VS_{1,2}$") may be determined as follows:

$VS_{1,2}$=(# of common content items)/(# of content items consumed by $U1$)

where $0 \leq VS_{1,2} \leq 1$ $VS_{1,2}$=2 content items/4 content items=0.5

By contrast, the directional content similarity coefficient for User 2 with respect to User 1 may be determined by calculating the portion of the total number of content items consumed by User 2 that have also been consumed by User 1. In this example, User 2 has previously consumed 3 content items, and User 1 and User 2 have both consumed two content items (e.g., "Terri" and "Jack"). Thus, the directional content similarity coefficient for User 2 with respect to User 1 ("$VS_{2,1}$") may be determined as follows:

$VS_{2,1}$=(# of common content items)/(# of content items consumed by $U2$)

where $0 \leq VS_{2,1} \leq 1$ $VS_{2,1}$=2 content items/3 content items=0.66

As noted above, in this example, the commonality of content preferences is greater in one direction (e.g., User 2 relative to User 1) than the other direction (e.g., User 1 relative to User 2). As such, the unwatched third program in User 2's history (i.e., "People Like Us") is more likely to be of interest to User 1, and the unwatched two programs in User 1's history (i.e., "X-Men" and "Snitch") are less likely to be of interest to User 2.

As another example, the directional content similarity coefficient for User 1 with respect to User 3 can be determined by calculating the portion of the total number of content items consumed by User 1 that have also been consumed by User 3; and the directional content similarity coefficient for User 1 with respect to User 4 can be determined by calculating the portion of the total number of content items consumed by User 1 that have also been consumed by User 4.

$VS_{1,3}$=2 content items/4 content items=0.5

$VS_{1,4}$=3 content items/4 content items=0.75

As will be appreciated, the system is not limited to determining directional content similarity coefficients with respect to the requesting user, but in some embodiments, may also determine directional content similarity coefficients for any user with respect to another user of the content service.

At step 312, the system may identify the one or more content items that have been consumed by both the requesting user and the user being analyzed during step 308 (e.g., the sampled user). In some embodiments, the system may retrieve from memory a listing of the content items that have been consumed by both the requesting user and the user being analyzed at step 308. At step 313, the system may begin a loop that is performed for the one or more content items that have been consumed by the requesting user and the user being analyzed during step 308. In some embodiments, the system may begin a loop that is performed for one, some, or all of the content items identified during step 312. At step 314, the system may determine the popularity score for the content item being analyzed at step 313. In some embodiments, the popularity score indicates a count of the number of times, in total, that a particular content item has been consumed by all users of the content service within the past month. In other embodiments, the popularity score may indicate a count of the number of times, in total, that a particular content item has been consumed by a subset of users of the content service within a particular time period (e.g., one month). As discussed above, the popularity score represents the overall popularity of a content item, and can be measured by any desired metric in addition to, or instead of, the total number of consumptions within a predetermined time period. For example, the popularity score may be based on dollar value of sales of the content, the total number of user purchases, a quantification of a match between the content and the user's taste profile, or any other desired metric. In some embodiments, the system may retrieve the popularity score for a content item from consumption history data obtained during step 310. After determining and/or retrieving the popularity score for the content item being analyzed during step 313, the method may proceed to step 315.

Referring now to FIG. 3B, in some embodiments, the system may determine a user similarity coefficient (e.g., user similarity score) for the user being analyzed during step 308 by (i) determining the directional content similarity coefficient to popularity score ratio for each content item consumed by both the requesting user and the user being analyzed during step 308 (e.g., step 315), and then (ii) adding the determined ratio to an aggregate or total ratio being maintained by the system during loop 313 (e.g., step 316).

As will be discussed in more detail with respect to FIG. 3C, in some embodiments, to save computational resources, the system may determine a user similarity score for a sampled user by (i) calculating a total or aggregate popularity score for the content items consumed by both the requesting user and the sampled user, and then (ii) determining a directional content similarity coefficient to total popularity score ratio. In these embodiments, where the total popularity of content items consumed by two (or more) users is used to determine user similarity scores, a few extremely popular content items may generate a large total popularity score, and may skew the user similarity score (e.g., the directional content similarity coefficient to total popularity score ratio). However, by analyzing the popularity score of each content item with respect to the directional content similarity coefficient, rather than the aggregate popularity of commonly consumed content items, the system may effectively reduce the weight attributed to a small number of content items that may be extremely popular, and place more emphasis (or weight) on each content item consumed by both users (e.g., the requesting user and the sampled user), including those content items having a lower general level of popularity.

Referring back to FIG. 3B, at step 315, the system may determine the directional content similarity coefficient to popularity score ratio by calculating the arithmetic product of (i) the directional content similarity coefficient for the user being analyzed during step 308, and (ii) the inverse of the popularity score for the content items consumed by both the requesting user and the user being analyzed during step 308. The system may retrieve the popularity score for the commonly consumed content items from data obtained during step 314.

At step 316, the system may add the directional content similarity coefficient to popularity score ratio determined during step 315 to a total or aggregate directional content similarity coefficient to popularity score ratio being maintained and/or stored by the system for the content items being analyzed during loop 313. After step 316, the system may return to step 313 to continue the loop until all of the identified content items have been processed, and when those items have been processed, the system may proceed to step 317.

Referring back to the example illustrated in FIG. 4A, in this embodiment, to determine the total or aggregate directional content similarity coefficient to popularity score ratio for User 1 with respect to User 2 ("US'1,2"), the system may first calculate a directional content similarity coefficient to popularity score ratio for each content item consumed by both User 1 and User 2. The system may then calculate the sum of those ratios to determine the total or aggregate ratio. Given that User 1 and User 2 both consumed "Terri" and "Jack," the total or aggregate directional content similarity coefficient to popularity score ratio for User 1 with respect to User 2 may be determined as follows:

where $P_n$=Popularity Score of $n^{th}$ common content item consumed by both User 1 and User 2; and where $(VS_{1,2}/P_n)$=directional content similarity coefficient to popularity score ratio;

$$US'_{1,2} = (VS_{1,2}/P_1) + (VS_{1,2}/P_2) + \ldots (VS_{1,2}/P_n)$$
$$= (.5/21) + (.5/15)$$
$$= .05714$$

Likewise, the total or aggregate directional content similarity coefficient to popularity score ratio for User 1 with respect to User 3 ("US'$_{1,3}$") and the total or aggregate directional content similarity coefficient to popularity score ratio for User 1 with respect to User 4 ("US'$_{1,4}$"), may be determined as follows:

$$US'_{1,3} = (VS_{1,3}/P_1) + (VS_{1,3}/P_2) = (.5/85) + (.5/21) = .02969$$
$$US'_{1,4} = (VS_{1,4}/P_1) + (VS_{1,4}/P_2) + (VS_{1,4}/P_3)$$
$$= (.75/178) + (.75/85) + (.75/21)$$
$$= .04875$$

At step 317, the system may assign the user being analyzed during step 308 (e.g., the sampled user) a user similarity coefficient (e.g., user similarity score) corresponding to the total or aggregate directional content similarity coefficient to popularity score ratio determined during step 316. For example, referring to the example above, during step 317, the system may assign User 2 a user similarity score of 0.05714, which corresponds to the total or aggregate directional content similarity coefficient to popularity score ratio for User 1 with respect to User 2. Similarly, the system may assign User 3 a user similarity score of 0.02969; and may assign User 4 a user similarity score of 0.04875. As will be discussed in further detail below, the user similarity score assigned to a sampled user may be utilized by the system to rank users based on a degree of similarity in content preferences with the requesting user. Accordingly, in some embodiments, higher similarity scores may indicate a higher degree of similarity in content preferences between two users (e.g., the requesting user and the sampled user). The content recommendation system may utilize this information to provide better targeted content recommendations to the requesting user by identifying content items that have been previously consumed by users having similar content preferences as the requesting user.

In some embodiments, the system may utilize the user similarity score to adjust or modify other user preference metrics or scores that are generated based on additional criteria beyond the consumption history of two users (e.g., the requesting user and the sampled user). For example, and as discussed further below, the system may compare the genre preferences between the requesting user and the genre preferences of a sampled user to generate a separate content preference metric (or score). The system may then adjust the separate content preference metric based on the user similarity score (e.g., the total or aggregate directional content similarity coefficient to total popularity score ratio) determined during step 316.

FIG. 3C illustrates an example method of determining user similarity scores for one or more sampled users, based on the consumption histories of the sampled user and the requesting user. To save computational resources, rather than determining a sum of the directional content similarity coefficient to popularity score ratio for each content item consumed by both the requesting user and the sampled user, the system may calculate a total or aggregate popularity score for the content items consumed by both the requesting user and the sampled user, and then determine a directional content similarity coefficient to total popularity score ratio. Steps 320 to 324 illustrated in FIG. 3C may include the same features and/or perform the same functions, respectively, as steps 310 to 314 discussed above with respect to FIG. 3B. For example, similar to the functions performed during step 314 discussed above, at step 324 the system may determine the popularity score for the content item being analyzed at step 323.

At step 325, the system may add the popularity score determined during step 324 to a total (or aggregate) popularity score that is being maintained by the system during loop 323. During step 325, the system may store the total popularity score in memory for subsequent retrieval. After step 325, the system may return to step 323 to continue the loop until all of the identified content items have been processed, and when those items have been processed, the system may proceed to step 326.

Referring now to the example in FIG. 4A, with respect to the one or more embodiments depicted in FIG. 3C, the system may determine the total popularity score for the content items consumed by both User 1 and User 2 ("TP$_{1,2}$") by calculating the sum (e.g., arithmetic sum) of popularity scores for each content item consumed by both User 1 and User 2. Given that User 1 and User 2 have both consumed "Terri" and "Jack," the total popularity score for User 1 and User 2 may be determined as follows:

where $P_n$=Popularity Score of the $n^{th}$ common content item; and n=2

$$TP_{1,2} = SUM(P_1 + P_2 + \ldots + P_n)$$

$TP_{1,2}=21+15=36$

Similarly, the total popularity score for the content items consumed by both User 1 and User 3 ("$TP_{1,3}$"), and the total popularity score for the content items consumed by both User 1 and User 4 ("$TP_{1,4}$") may be determined as follows:

$TP_{1,3}=SUM(P_1+P_2+\ldots+P_n)=85+21=106$ $TP_{1,4}=SUM(P_1+P_2+\ldots+P_n)=178+85+21=284$ At step 326, the system may determine a directional content similarity coefficient to total popularity score ratio. The system may determine the directional content similarity coefficient to total popularity score ratio by calculating the arithmetic product of (i) the directional content similarity coefficient for the user being analyzed during step 308, and (ii) the inverse of the total popularity score for the content items consumed by both the requesting user and the user being analyzed during step 308 (e.g., the sampled user). The system may retrieve the total popularity score for the commonly consumed content items from data obtained during step 325. Referring to the example above, based on the directional content similarity coefficient and total popularity score determined above for Users 1 and 2, the system may determine the directional content similarity coefficient to total popularity score ratio for User 1 with respect to User 2 ("$US_{1,2}$") as follows:

$US_{1,2}=(VS_{1,2}/TP_{1,2})=0.5/36=0.01389$

Likewise, the directional content similarity coefficient to total popularity score ratio for User 1 with respect to User 3 ("$US_{1,3}$"), and the directional content similarity coefficient to total popularity score ratio for User 1 with respect to User 4 ("$US_{1,4}$"), may be determined as follows:

$US_{1,3}=(VS_{1,3}/TP_{1,3})=0.5/106=0.00471$ $US_{1,4}=(VS_{1,4}/TP_{1,4})=0.75/284=0.00264$

At step 327, the system may assign the user being analyzed during step 308 a user similarity coefficient (e.g., user similarity score) corresponding to the directional content similarity coefficient to total popularity score ratio for that user as determined during step 326. For example, referring to the example above, during step 317, the system may assign User 2 a user similarity score of 0.01389, which corresponds to the directional content similarity coefficient to total popularity score ratio for User 1 with respect to User 2. Similarly, the system may assign User 3 a user similarity score of 0.00471; and may assign User 4 a user similarity score of 0.00264.

Referring back to FIG. 3A, at step 328, the system may rank one or more of the users analyzed during step 308 (e.g., sampled users) based at least in part on the user similarity coefficients assigned to the one or more users during step 317, or in some embodiments, during step 327. For example, the system may rank the sampled users by descending user similarity scores. In instances where two or more sampled users have been assigned the same user similarity score, the system may rank users based on popularity scores. As an example, the system may assign a higher ranking to the sampled user that consumed the content item having the highest popularity score. As another example, the system may assign a higher ranking to the sampled user that consumed a content item with the highest popularity score that has not been previously consumed by the requesting user. In some embodiments, the system may provide user rankings for users who have not consumed one or more of the same content items as the requesting user (e.g., users other than the one or more users analyzed during step 308). As will be discussed further below, in such embodiments, the system may utilize other user preferences, metrics, or content information to determine similarities in content preferences between the requesting user and other users of the content service. The system may correlate these metrics with the determined user similarity scores to generate a comprehensive list of user rankings.

As illustrated in FIG. 4D, in some embodiments, the system may output for display to a display device, such as display device 112, the user rankings determined during step 328. The user interface may display a username or profile name associated with a particular ranked user. The user interface may also display the user similarity score generated for one or more ranked users. In some embodiments, the system may utilize the user similarity score (e.g., raw score) to generate other metrics (e.g., transformed scores, normalized scores, etc.). There are a variety of ways in which the system may determine such metrics without departing from the scope of the present disclosure. For example, referring to FIG. 4D, the system may utilize the user similarity score to generate and/or display a percentage (%) or other value indicating the degree of similarity between the requesting user and the ranked user. In this example, the system may apply an algorithm to the user similarity score to generate the "match" percentage. In this example, the algorithm may include applying a constant (or scalar value) to the user similarity score to generate the "match" percentage. In another example, the system may generate the "match" percentage by determining the percentage of other users of the content service having content similarity scores that fall below the content similarity score for a particular user.

As illustrated in FIG. 4D, in some embodiments, the system may provide the requesting user with an option to adjust or modify user rankings. For example, the requesting user may use an input device (e.g., device 208) to reassign rankings to one or more users. In other embodiments, the system may output for display the one or more content items consumed by both the requesting user and another user. Additionally or alternatively, the system may output for display the one or more content items that have not been consumed by both the requesting user and another user. Displaying such information may assist the requesting user when modifying or adjusting one or more user rankings determined during step 328.

In some embodiments, the content recommendation system may automatically adjust user rankings based on user feedback. The content service may provide users with an interface and/or options for providing user feedback with respect to particular users (e.g., user ratings). The user ratings may be based on a variety of factors, such as the number of positive or negative comments from other users that are associated with a particular user, the number of "likes" received for content items recommend by that user, as well as other criteria. As an example, the recommendation system may adjust (e.g., increase) the ranking and/or similarity score of a highly-rated user. As another example, if the requesting user has previously provided positive feedback with respect to a particular user and/or content items recommended by that user, the system may adjust (e.g., increase) the ranking for that user. In some embodiments, the system may prompt the user to confirm an adjustment to or modification of the user rankings determined during step 328.

In other embodiments, the content recommendation system may automatically adjust one or more of the rankings determined during step 328 based on content ratings. For example, content ratings previously provided by the requesting user (or other users of the content service) for various content items may be processed by the recommendation system to generate predictive ratings for other content items. The system may use the user content ratings and/or the predictive ratings to automatically adjust or modify the user rankings determined during step 328 based on other user content criteria or preferences, such as genre preferences.

As noted above, the content recommendation system may process additional data indicating the requesting user's preferences when identifying content items to recommend to the requesting user. For each content item, for example, a metadata database (or other storage medium) may store the title, genre, plot, director, summary, ratings, and other attributes of the content item. The recommendation system may process data stored in the metadata database to determine which content items that have been previously consumed by a ranked user correlate well with one or more of the content items processed during step 313 (or step 323), and based on the determination, may recommend one or more content items to the requesting user. In addition, as discussed above, the system may prioritize content items previously consumed by ranked user to recommend to the requesting user based on a variety of factors and/or content item attributes, including popularity.

In some embodiments, the content recommendation system may communicate with an advertising server or other computing device to select and/or retrieve advertising content to display to the requesting user. The content recommendation system may select and/or retrieve advertising content based on one or more content items having been recommended to the requesting user. The content recommendation system may also select and/or retrieve advertising content based on information stored in the metadata database for the one or more recommended content items. Advertising content may also be selected and/or retrieved by the content recommendation system based on the preferences of other users that have been identified as having similar tastes as the requesting user (e.g., a threshold similarity score). The recommendation system may leverage the content preferences of the requesting user, as well as the preferences of sampled users, to more accurately select and/or retrieve advertising content that is targeted (e.g., personalized, customized, tailored, etc.) to the requesting user.

At step 330, the system may generate a content recommendation for the requesting user based on user rankings determined during step 328. The system may process the consumption history data associated with a ranked user to identify one or more content items to recommend to the requesting user. For example, in some embodiments, the system may process consumption history data of ranked users in descending order of rank to identify content items that have not been previously consumed by the requesting user. In other embodiments, the system may process consumption history data of ranked users in descending order of similarity scores or other metrics, such as "match" percentage. As discussed in more detail below, in some of these embodiments, if two ranked users have similar or the same similarity scores, the system may prioritize ranked users based on additional user criteria or content preferences, and then recommend one or more content items to the requesting user based on the adjusted rankings. As illustrated in FIG. 4E, in some embodiments, the system may output for display to a display device, such as display device 112, the content recommendations determined during step 330 and the corresponding sampled user. In some embodiments, as illustrated in FIG. 4E, the system may display an avatar, virtual object, or other icon associated with the user (or user profile, user account, etc.) providing a recommendation to the requesting user. The system may also provide the user with an option to begin consuming the recommended content item.

Figure 4B:
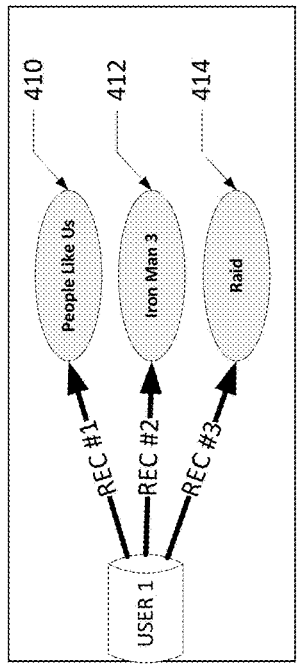

As discussed above with respect to FIG. 3C, in some embodiments, the system may calculate user similarity scores for a sampled user by determining a directional content similarity coefficient to total popularity score ratio. FIG. 4B illustrates exemplary rankings for Users 2-4 based one or more aspects of this embodiment. As shown in FIG. 4B, the system may rank users (e.g., Users 2-4) based on their respective user similarity score (e.g., user similarity coefficient). As discussed above, users may be ranked by descending similarity scores (or other metrics). Accordingly, because User 2 has been assigned a user similarity score of 0.01389, which is higher than the user similarity scores for User 2 and User 3, User 2 may be ranked $1^{st}$. Additionally, User 3 having a user similarity score of 0.00471 may be ranked $2^{nd}$, and User 4 having a user similarity score of 0.00264 may be ranked $3^{rd}$. The system may utilize these rankings and/or the user similarity scores for Users 2-4 to generate content recommendations for User 1, as discussed above with reference to step 328 of FIG. 3A. For example, because User 2 may be considered to have the most similar tastes in content as User 1, (e.g., the largest similarity score with respect to User 1), the system may generate a content recommendation for User 1 based at least in part on the content consumption history of User 2. For instance, User 1 has yet to consume the content item "People Like Us," which has already been consumed by User 2. Thus, as illustrated by element 410 in FIG. 4B, the system may generate a first recommendation for User 1 to consume "People Like Us" based on the consumption history and behavior of User 2.

The system may provide additional content recommendations to User 1 based on the consumption history of other users (e.g., Users 3-4). For example, as illustrated by element 412, the system may generate a second recommendation for User 1 based on the consumption history of User 3. As shown in FIG. 4A, User 1 has yet to consume "Iron Man 3" and "Raid," which have both already been consumed by User 3. As discussed above with reference to FIG. 3, the system may prioritize the recommendation of content items based on popularity. Thus, while User 1 has not yet consumed "Iron Man 3" or "Raid," as illustrated by element 412, the system may generate the second recommendation prioritizing the content item with the higher popularity score, i.e., "Iron Man 3." The system may then generate a third recommendation that User 1 consume "Raid," as illustrated by element 414. There are various other ways in which the system may prioritize content items when generating a content recommendation for a user without departing from the scope of the present disclosure, for example, the system may prioritize content items based on cost, user rating history, and other suitable criteria.

Referring back to FIG. 4A, User 1 has yet to consume "Raid," which has already been consumed by User 4. Because the system has already recommended "Raid" to User 1 based on the consumption history of User 3, the system may decline to recommend the content item to User 1 a second time since the system has already recommended this item to User 1. In some embodiments, the system may notify the requesting user that multiple users have previously consumed "Raid." For example, the user may display a message or icon on the user's display indicating that multiple users have previously consumed a particular content item. In addition to providing such notifications, the system may also provide the requesting user with an option to adjust the ordering of content recommendations as depicted in FIG. 4E.

Figure 4C:
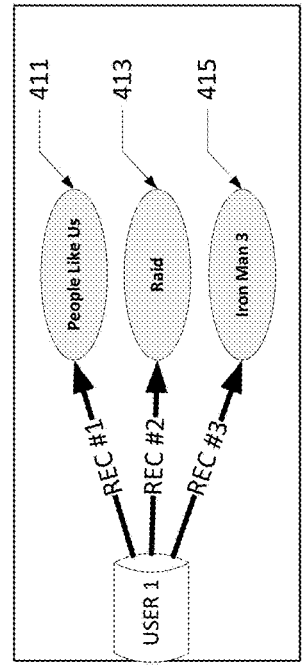

As discussed above with respect to FIG. 3B, in some embodiments, the system may calculate user similarity scores for a sampled user by determining a sum of the directional content similarity coefficient to popularity score ratios for each content item consumed by both the requesting user and the sampled user. FIG. 4C illustrates exemplary rankings for Users 2-4 based one or more aspects of this embodiment. As shown in FIG. 4C, while Users 2-4 are still ranked by descending user similarity scores, these rankings differ from the rankings depicted in FIG. 4B given the difference in user similarity scores calculated for Users 2-4. As shown in FIG. 4C, based on their respective similarity scores, User 2 is still ranked $1^{st}$, User 4 is now ranked $2^{nd}$, and User 3 is now ranked 3rd. The system may utilize these rankings and/or the similarity scores of Users 2-4 to generate content recommendations for User 1. Like the previous content recommendations depicted in FIG. 4B, the system may generate a first recommendation for User 1 to consume "People Like Us," as illustrated by element 411 in FIG. 4C.

The system may then generate a second recommendation for User 1 based on the consumption history of the second ranked user, e.g., User 4. As shown in FIG. 4A, User 1 has yet to consume "Raid," which has already been consumed by User 4. Accordingly, as illustrated by element 413, the system may generate a recommendation for User 1 to consume "Raid." Additionally, the system may then generate a third recommendation for User 1 based on the consumption history of the user ranked last, e.g., User 4. As shown in FIG. 4A, User 1 has yet to consume "Iron Man 3" and "Raid," which has already been consumed by User 3. The system may prioritize the third content recommendation based on the popularity of the two content items. Additionally or alternatively, given that the system has already generated a recommendation for the user to consume "Raid," the system may not provide an additional content recommendation for this particular content item. Accordingly, as illustrated by element 415, the system may generate a recommendation for User 1 to consume "Iron Man 3."

In the example embodiments described above with reference to FIGS. 3A-C, the system may be configured to generate content ratings for a user by identifying other users with similar content preferences based in part on the user's content consumption history and whether two users have commonly consumed generally unpopular content items. Popularity may be determined by the number of times a content item has been purchased within a predetermined period of time. Thus, the more times a content item is purchased, the higher the associated popularity for that content item.

By contrast, in an alternative embodiment, the system may be configured to generate content ratings for a user by identifying other users with similar content preference based in part on whether two users both dislike generally popular content items. In this alternative embodiment, the system may be configured to perform one or more of the steps described in reference to FIGS. 3A-3C.

In this alternative embodiment, the system may identify one or more other users as having a similar content consumption history as the requesting user based in part on determining whether any of the content items disliked by the requesting user has also been disliked by one or more other users of the content service. In some aspects of this embodiment, the system may be configured to determine whether a user dislikes a particular content item. There are a variety of ways in which the system may allow a user to mark and/or identify those content items that the user dislikes, such as clicking a thumbs-down icon or other indicator representing a user's dislike of a content item. As another example, the system may associate content ratings below a predetermined threshold rating as an indication that a user disliked a particular content item. Additionally or alternatively, in this alternative embodiment, for each sampled user identified as having a similar content consumption history as the requesting user (e.g., the sampled user dislikes at least one content item in common with the requesting user), the system may retrieve content consumption history for the sampled user and determine a direction content similarity coefficient for the user based on the content items commonly disliked by the requesting user and the sampled user.

In this alternative embodiment, the directional content similarity coefficient represents a value indicating the relative significance of the fact that a particular content was disliked by one user and not the other. The directional content similarity coefficient may be based on a ratio of the number of programs commonly disliked between two users, and the total number of programs disliked by each respective user. For example, if users A and B have 5 programs in common that they both dislike in their consumption histories, but user A has only 10 programs that he/she disliked in his/her consumption history (e.g., user A has previously disliked 10 content items over a predetermined time period), while user B has 15 programs that he/she disliked in his/her consumption history, then the commonality of content preferences is greater in one direction than another (e.g., the commonality of content preferences is greater for user A relative to user B, than it is for user B relative to user A). In other words, the content commonly disliked by both user A and user B comprises a greater proportion of the total content disliked by user A (e.g., 5 out of 10 programs), than the proportion of the total content disliked by user B (e.g., 5 out of 15 programs). As such, the 5 programs in user A's history that are not commonly disliked are more likely to be of interest to user B, and the 10 programs in user B's history that are not commonly disliked are less likely to be of interest to user A.

Figure 5:
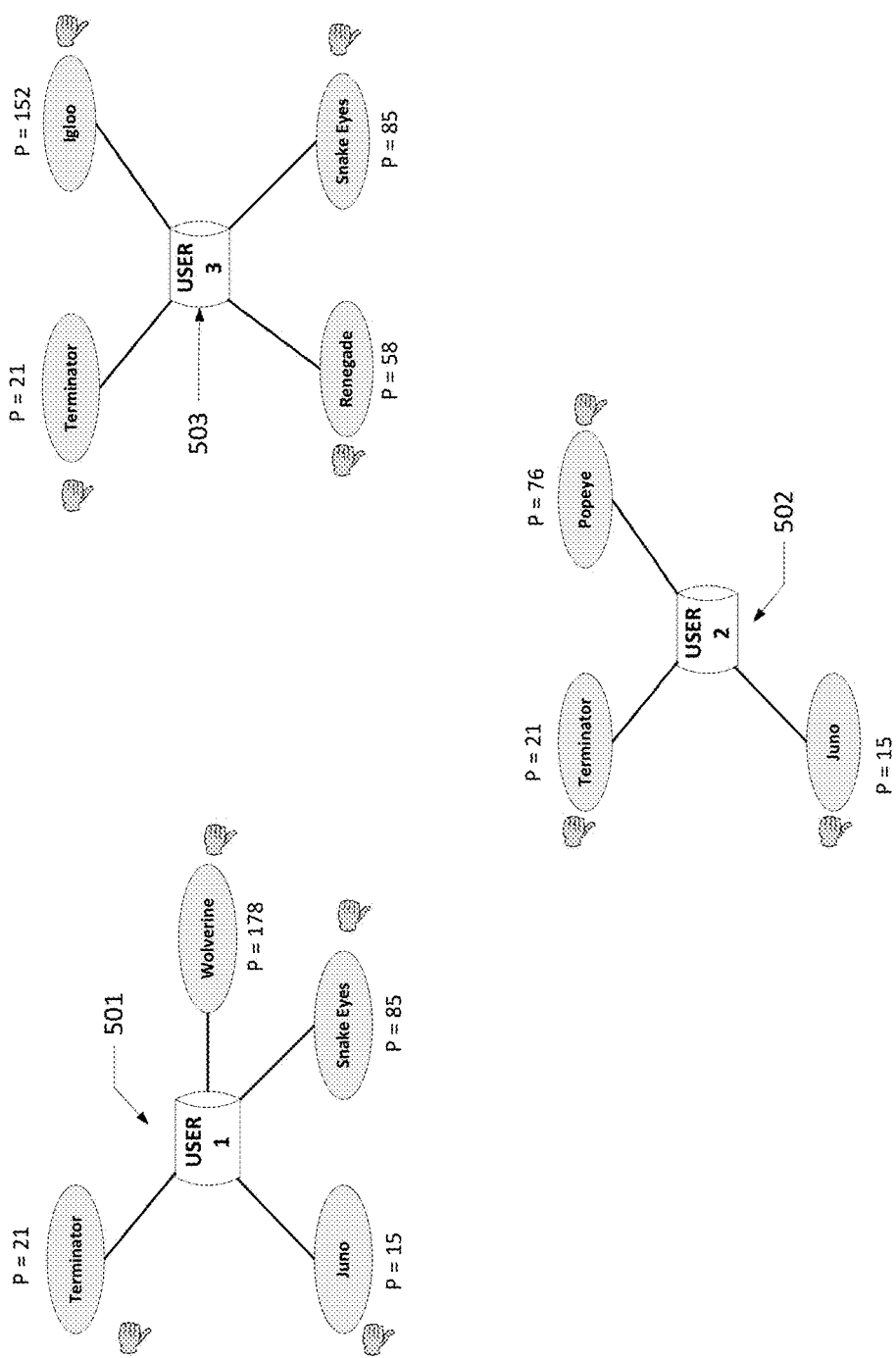
FIG. 5 illustrates an exemplary diagram for generating content recommendations according to one or more illustrative aspects of the disclosure.

In some aspects of this alternative embodiment, the system may determine a directional content similarity coefficient for the requesting user with respect to a second user (e.g., a sampled user) by calculating the ratio of the number of content items that have been commonly disliked by both the requesting user and the sampled user to the total number of content items that have been disliked by the requesting user. FIG. 5 illustrates example diagrams depicting a portion of the consumption history information for several users of a content service (e.g., Users 1-3). In this example, the partial content consumption history for the requesting user (i.e., User 1) is depicted by element 501. As shown in FIG. 5, User 1 has previously disliked four separate content items, each associated with a particular popularity score. In this example, the popularity score indicates the number of instances that a content item has been consumed within the past month. As such, the content item labeled "Terminator" has a popularity score of 21.

In this alternative embodiment, the directional content similarity coefficient for User 1 with respect to User 2 may be determined by calculating the portion of the total number of content items disliked by User 1 that have also been disliked by User 2. In this particular example, User 1 has previously disliked 4 content items, and User 1 and User 2 have both disliked two content items (e.g., "Terminator" and "Juno"). Thus, the directional content similarity coefficient for User 1 with respect to User 2 ("$VS_{1,2}$") may be determined as follows:

$VS_{1,2}$=(# of commonly disliked content items)/(# of content items consumed by $U1$)

where $0 \leq VS_{1,2} \leq 1$ $VS_{1,2}$=2 content items/4 content items=0.5

By contrast, the directional content similarity coefficient for User 2 with respect to User 1 may be determined by calculating the portion of the total number of content items disliked by User 2 that have also been disliked by User 1. In this example, User 2 has previously disliked 3 content items, and User 1 and User 2 have both commonly disliked two content items (e.g., "Terminator" and "Juno"). Thus, the directional content similarity coefficient for User 2 with respect to User 1 ("$VS_{2,1}$") is 0.66 (i.e., ⅔). As yet another example, the directional content similarity coefficient for User 1 with respect to User 3 can be determined by calculating the portion of the total number of content items disliked by User 1 that have also been disliked by User 3. Thus, the directional content similarity coefficient for User 1 with respect to User 3 ("$VS_{2,1}$") is 0.5 (i.e., 2/4).

In this alternative embodiment, the system may identify the one or more content items that have been commonly disliked by both the requesting user and the sampled user. Similar to step 313 discussed above with reference to FIG. 3B, the system may begin a loop that is performed for the one or more content items that have been commonly disliked by the requesting user and the sampled user. During this loop, the system may determine and/or retrieve a popularity score for the content item, and then add the popularity score to a total popularity score being maintained by the system for each commonly disliked content item for a sampled user. Additionally, the system may determine a user similarity coefficient (e.g., user similarity score) for the sampled user being by (i) determining the popularity score to directional content similarity coefficient ratio for each content item commonly disliked by both the requesting user and the sampled user, and then (ii) adding the determined ratio to an aggregate or total ratio being maintained by the system.

Referring back to the example illustrated in FIG. 5, in this alternative embodiment, to determine the total or aggregate popularity score to directional content similarity coefficient ratio for User 1 with respect to User 2 ("$US'_{1,2}$"), the system may first calculate a popularity score to directional content similarity coefficient ratio for each content item disliked by both User 1 and User 2. The system may then calculate the sum of those ratios to determine the total or aggregate ratio. Given that User 1 and User 2 both disliked "Terminator" and "Juno," the total or aggregate popularity score to directional content similarity coefficient ratio for User 1 with respect to User 2 may be determined as follows:

where $P_n$=Popularity Score of $n^{th}$ common content item disliked by both User 1 and User 2; and where $(P_n/VS_{1,2})$=popularity score to directional content similarity coefficient ratio;

$$US'_{1,2} = (P_1/VS_{1,2}) + (P_2/VS_{1,2}) + \ldots (P_n/VS_{1,2})$$
$$= (21/.5) + (15/.5)$$
$$= 72$$

Likewise, given that User 1 and User 3 both disliked "Terminator" and "Snake Eyes," the total or aggregate popularity score to directional content similarity coefficient ratio for User 1 with respect to User 3 ("$US'_{1,3}$"), may be determined as follows:

$$US'_{1,3}=(P_1/VS_{1,3})+(P_2/VS_{1,3})=(85/0.05)+(21/0.05)$$
$$=212$$

In this alternative embodiment, the system may assign the sampled user a similarity coefficient (e.g., user similarity score) corresponding to the total or aggregate popularity score to directional content similarity coefficient ratio. The user similarity score assigned to a sampled user may be utilized by the system to rank users based on a degree of similarity in content preferences with the requesting user. Accordingly, in some embodiments, higher similarity scores may indicate a higher degree of similarity in content preferences between two users (e.g., the requesting user and the sampled user). The content recommendation system may utilize this information to generate better targeted content recommendations to the requesting user by identifying content items that have been previously consumed by users having similar content preferences as the requesting user. The system may utilize the user similarity score to adjust or modify other user preference metrics or scores that are generated based on additional criteria beyond the consumption history and commonly disliked content items of two users (e.g., the requesting user and the sampled user).

Additionally or alternative, the system may normalize or adjust the similarity score assigned to a user before displaying an actual score to the user via a display device or suitable communication interface. For example, the raw similarity score of 212 assigned to user 3 may be adjusted to 21.2 by dividing the raw score by 10 (or some other factor). As another example, the system may normalize similarity score based on the range of scores for all users (or a subset of users) such that the lowest user similarity corresponds to a score of zero (0), and the highest user similarity score corresponds to a score of one hundred (100).

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention.

I claim:

1. An apparatus comprising:
one or more processors; and
memory storing instructions that, when executed by the one or more processors, cause the apparatus to:
identify content items consumed by a target user, content items consumed by a group of first users, and content items consumed by a group of second users;
identify a first set of content items commonly consumed between the target user and the group of first users, and determine a first popularity value associated with the first set of content items;

identify a second set of content items commonly consumed between the target user and the group of second users, and determine a second popularity value associated with the second set of content items; and send, to the target user and after determining that the first popularity value associated with the first set of content items is lower than the second popularity value associated with the second set of content items, a recommendation for a recommended content item, wherein the recommendation is based, at least in part, on a content consumption history of the group of first users.

2. The apparatus of claim 1, wherein the instructions, when executed by the one or more processors, further cause the apparatus to verify that the target user has not previously consumed the recommended content item.

3. The apparatus of claim 1, wherein the instructions, when executed by the one or more processors, cause the apparatus to determine the first popularity value associated with the first set of content items by determining a number of times that each content item, of the first set of content items, has been purchased by one or more users.

4. The apparatus of claim 1, wherein the recommendation to the target user is further based on a number of times that each content item, of the content items consumed by the group of first users, has been consumed by one or more users.

5. The apparatus of claim 1, wherein the instructions, when executed by the one or more processors, further cause the apparatus to:
assign user rankings to the group of first users and the group of second users based, at least in part, on an inverse of the first popularity value associated with the first set of content items and an inverse of the second popularity value associated with the second set of content items.

6. The apparatus of claim 5, wherein the instructions, when executed by the one or more processors, further cause the apparatus to:
provide a user interface to the target user, wherein the user interface is configured to receive user input selections indicating one or more modifications to the assigned user rankings.

7. An apparatus comprising:
one or more processors; and
memory storing instructions that, when executed by the one or more processors, cause the apparatus to:
identify content items disliked by a target user, content items disliked by a group of first users, and content items disliked by a group of second users;
identify a number of content items commonly disliked between the target user and the group of first users;
identify a number of content items commonly disliked between the target user and the group of second users;
select the group of first users based, at least in part, on a comparison of:
the number of content items commonly disliked between the target user and the group of first users, and
the number of content items commonly disliked between the target user and the group of second users; and
send, to the target user, a recommendation for a recommended content item, wherein the recommendation is based, at least in part, on a content consumption history of the group of first users.

8. The apparatus of claim 7, wherein the instructions, when executed by the one or more processors, further cause the apparatus to:
verify that the target user has not previously consumed the recommended content item.

9. The apparatus of claim 7, wherein one or more of the content items disliked by the target user comprise Video on Demand (VOD) content.

10. The apparatus of claim 7, wherein the instructions, when executed by the one or more processors, cause the apparatus to select the group of first users further based on:
a first popularity value associated with the content items commonly disliked between the target user and the group of first users; and
a second popularity value associated with the content items commonly disliked between the target user and the group of second users.

11. The apparatus of claim 10, wherein the instructions, when executed by the one or more processors, further cause the apparatus to:
provide a user interface to the target user, wherein the user interface is configured to receive user input selecting the group of second users instead of the group of first users; and
send, to the target user, a second recommendation for a second recommended content item, wherein the second recommendation is based, at least in part, on a content consumption history of the group of second users.

12. The apparatus of claim 10, wherein the first popularity value associated with the content items commonly disliked between the target user and the group of first users is based, at least in part, on a number of times that each content item, of the content items commonly disliked between the target user and the group of first users, has been consumed by one or more users.

13. The apparatus of claim 10, wherein the first popularity value associated with the content items commonly disliked between the target user and the group of first users comprises a sum of individual popularity values for each of the content items commonly disliked between the target user and the group of first users.

14. An apparatus comprising:
one or more processors; and
memory storing instructions that, when executed by the one or more processors, cause the apparatus to:
identify content items consumed by a target user and content items disliked by the target user, content items consumed by a group of first users and content items disliked by the group of first users, and content items consumed by a group of second users and content items disliked by the group of second users;
identify content items commonly consumed between the target user and the group of first users;
identify content items commonly consumed between the target user and the group of second users;
identify content items commonly disliked between the target user and the group of first users;
identify content items commonly disliked between the target user and the group of second users;
rank the group of first users and the group of second users based, at least in part, on:
an inverse of a popularity value associated with the content items commonly consumed between the target user and the group of first users;

an inverse of a popularity value associated with the content items commonly consumed between the target user and the group of second users;

a first number of the content items commonly disliked between the target user and the group of first users; and a second number of the content items commonly disliked between the target user and the group of second users;

select the group of first users based on the ranking of the group of first users and the group of second users; and send, to the target user, a recommendation for a recommended content item, wherein the recommendation is based, at least in part, on a consumption history of the group of first users.

15. The apparatus of claim 14, wherein the instructions, when executed by the one or more processors, cause the apparatus to rank the group of first users and the group of second users further based, at least in part, on:

a popularity value associated with the content items commonly disliked between the target user and the group of first users; and a popularity value associated with the content items commonly disliked between the target user and the group of second users.

16. The apparatus of claim 14, wherein the instructions, when executed by the one or more processors, further cause the apparatus to:

provide a user interface to the target user, wherein the user interface is configured to receive user input selecting the group of second users instead of the group of first users; and send, to the target user, a second recommendation, for a second recommended content item, wherein the second recommendation is based, at least in part, on a content consumption history of the group of second users.

17. The apparatus of claim 14, wherein the instructions, when executed by the one or more processors, further cause the apparatus to:

verify that the target user has not previously consumed the recommended content item.

18. The apparatus of claim 14, wherein the recommendation is further based, at least in part, on a number of times that each content item, of the content items consumed by the group of first users, has been consumed by one or more users.

19. The apparatus of claim 14, wherein the popularity value associated with the content items commonly consumed between the target user and the group of first users is based, at least in part, on a number of times that each content item, of the content items commonly consumed between the target user and the group of first users, has been purchased by one or more users.

20. The apparatus of claim 14, wherein the instructions, when executed by the one or more processors, further cause the apparatus to:

adjust the recommendation in accordance with one or more preferences stored in an account for the target user.

21. The apparatus of claim 1, wherein the instructions, when executed by the one or more processors, further cause the apparatus to:

provide a user interface to the target user, wherein the user interface is configured to:

display the recommendation; and receive one or more user input selections requesting to consume the recommended content item.

* * * * *

UNITED STATES PATENT AND TRADEMARK OFFICE
CERTIFICATE OF CORRECTION

Page 1 of 1

PATENT NO. : 10,331,725 B2
APPLICATION NO. : 15/677889
DATED : June 25, 2019
INVENTOR(S) : Zhen Zhao It is certified that error appears in the above-identified patent and that said Letters Patent is hereby corrected as shown below:

In the Specification

Column 4, Detailed Description, Line 16:
Please delete "HTMLS," and insert --HTML5,--

Column 11, Detailed Description, Line 23:
Delete "("US'1,2")," and insert --("US'$_{1,2}$"),--

Column 17, Detailed Description, Line 19:
Delete "3rd." and insert --3$^{rd}$.--

Signed and Sealed this
Fourteenth Day of January, 2020

Andrei Iancu
*Director of the United States Patent and Trademark Office*